March 13, 1945.  R. L. HOPKINS  2,371,295
SNAP FASTENER
Filed Jan. 10, 1944

Inventor
ROBERT L. HOPKINS

By Clarence A. O'Brien
and Harvey B. Jacobson
Attorneys

Patented Mar. 13, 1945

2,371,295

UNITED STATES PATENT OFFICE 2,371,295

SNAP FASTENER

Robert L. Hopkins, Norfolk, Va.

Application January 10, 1944, Serial No. 517,717

5 Claims. (Cl. 24—237)

This invention relates to a novel and, therefore, improved snap fastener or "snap," as it is often briefly referred to, and has more particular reference to a type of fastener such as is especially, but not necessarily, usable in connection with fishing tackle, the same being adaptable for mounting directly on one end of the fishing line, or on the line through the medium of a conventional swivel coupler.

The ordinary or conventional snap fastener for use in this line of endeavor is generally constructed from a single length of wire wherein the main length or limb is fashioned at one end with a line anchoring eye, the other end being formed with a return bend designed into a loop to serve as a link, and the free end of the link being provided with a snap-hook laterally arranged and engageable with the intermediate part of the main limb, thus providing a convenient quick opening and closing link to accommodate the fish hook, lure or other angler's accessory.

The inherent spring tension in the snap-hook portion serves to yieldably hold the hook in its normally closed position. However, and due to the simplicity in constructional design, the utility of the link is limited. For example, it is a matter of common knowledge that these types of snap fasteners, during the casting or at the strike of a fish, sometimes spring open, with the result that the wire will straighten out or break off and both fish and equipment will be lost.

The purpose of the instant invention is to provide an extra keeper latch, this being in the form of an auxiliary or second hook which is releasably engageable with the intermediate part of that limb of the link carrying the aforementioned snap hook. It is believed that this added feature will render the overall structure devoid of the aforementioned objections and weaknesses in that the structure, thus improved, is substantially foolproof and appreciably more reliable and aptly suited for intended purposes.

Other features and advantages will become more readily apparent from the following description and the accompanying illustrative drawing.

In the drawing, wherein like numerals are employed to designate like parts throughout the same:

Figure 1:
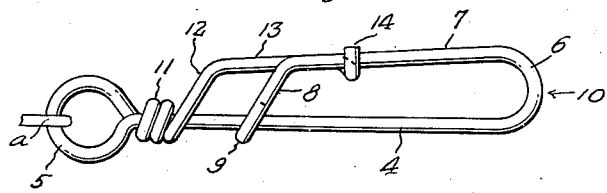
Figure 1 is an elevational view of the snap fastener as constructed and improved in accordance with the principles of the instant invention.
Figure 2:
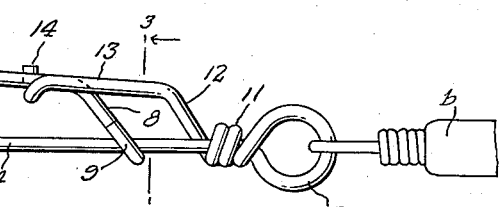
Figure 2 is a view showing the same structure seen in Figure 1 but observing it from the opposite side.
Figure 3:
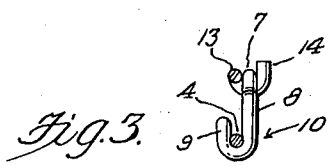
Figure 3 is a transverse section on the plane of the line 3—3 of Figure 2.

As before indicated the device is preferably made from a single length of wire of appropriate gauge and resilient but suitable resistive strength. The main longitudinal limb or stretch 4 is provided at one end with an eye 5 to accommodate either the line $a$ as shown in Figure 1 or a conventional swivel connector or coupler $b$ as shown in Figure 2. The opposite end of the wire is formed into a return bend as at 6 permitting the free end portion 7 to occupy a position in spaced parallelism to the part 4. The terminal end of the portion 7 is then directed obliquely as at 8 and fashioned into a snap hook 9 engageable with the intermediate part of the main limb 4 in a somewhat conventional manner, thus defining a loop-like link 10 to accommodate the fish hook (not shown), lure or other angling accessory. Referring again to the eye 5 it will be observed that the part of the wire from which it is formed is then coiled as at 11 around the main stem or limb 4, the free end portion 12 being directed laterally to assume a position somewhat parallel to the lateral opposite end 8. Further, and in alignment with the limb 7, the wire end 13 is fashioned into a safety keeper hook 14. The length of the extended wire terminal 13 is such as to position the hook 14 to releasably engage the intermediate part of the limb 7. It will be noticed too, that the coiling of the wire as at 11 is such as to provide the desired spring tension. Moreover, the bill of the hook 14 is turned in a direction opposite to the bill of the main snap hook 9. Further, the hook 14 counteracts, due to the spring tensioning of the parts 12 and 13, any likelihood of accidental opening of the hook 9.

As indicated, the primary purpose of this snap or connector is its use in connection with fishing or angling equipment, but it is not limited, obviously, to this particular field, as it can be used successfully wherever a snap or connecting link is desirable.

The opposing tension of the safety feature made up of parts 12, 13 and 14 prevents that part of the snap fastener, the main hook 9, from becoming unfastened, thereby preventing loss not only of the lure, hook or other type of accessory, but the fish as well. It is a common weakness with other types of snaps or connectors that, during casting or at the strike of a fish, it will sometimes unfasten, with the result that the wire will straighten out or break off and both fish and equipment will be lost. It is definitely asserted that this will not occur with the construction herein shown and described.

This snap or connector is adaptable to any type of swivel action which is so frequently used in connection with other types of snaps or connectors.

To operate, simply unfasten the hook 14 and then unfasten the hook 9. The latter part is passed through the eye or ring of the lure or other accessory. In reverse order, simply first snap the hook 9 in place, secondly the hook 14.

In practice, it is immaterial whether the coils 11 are directed in the direction shown in Figures 1 or 2 or are wound in an opposite direction. It is desirable, however, that the bills of the respective hooks should, by preference, turn in directions opposite to each other to insure the desired complemental action of said parts.

This snap can be made in different sizes and gauges of wire to cover all types of fishing from the smallest fresh water types to the large deep sea variety.

Minor changes in the shape, size and arrangement of details coming within the field of invention claimed may be resorted to in actual practice, if desired.

Having described the invention, what is claimed as new is:

1. A snap fastener of the class described comprising an elongated loop-like link having a relatively fixed eye at one end and a quick-opening resilient snap hook intermediate its ends, and a resilient safety hook carried by the link and engaging the snap hook for releasably retaining the latter in closed position and preventing accidental opening thereof.

2. A safety type snap fastener construction of the class described comprising an elongated link including a limb having an eye at one end and a return bend at the opposite end, said return bend providing a secondary limb spaced from and substantially parallel with the first-named limb, the free end of the secondary limb being provided with a laterally offset snap hook releasably engaging the intermediate portion of the first-named limb, and a safety hook engageable with the second-named limb to resist movement of the snap hook in the direction to disengage the latter from said limb, said safety hook being rigidly fastened on the first-named limb.

3. A safety type snap fastener construction of the class described comprising an elongated link including a limb having an eye at one end and a return bend at the opposite end, said return bend providing a secondary limb spaced from and substantially parallel with the first-named limb, the free end of the secondary limb being provided with a laterally offset snap hook releasably engaging the intermediate portion of the first-named limb, and a safety hook engageable with the second-named limb to resist movement of the snap hook in the direction to disengage the latter from the first-named limb, said safety hook being rigidly fastened on the first-named limb, said safety hook resiliently pressing against the second limb and having its bill opening in the direction opposite to the bill of the snap hook.

4. A snap fastener of the class described formed from a single length of wire bent into a loop-like link having parallel limbs, one short and one long, the long limb having an eye at one end, the short limb having a laterally directed end portion terminating in a snap hook engageable with the intermediate part of the long limb, a third limb parallel to and in alignment with the short limb, said third limb terminating in a hook engageable with the short limb, said hook constituting a safety feature having its bill turning in a direction opposite to that faced by the snap hook.

5. A snap fastener of the class described formed from a single length of wire bent into a loop-like link having parallel limbs, one short and one long, the long limb having an eye at one end, the short limb having a laterally directed end portion terminating in a snap hook engageable with the intermediate part of the long limb, a third limb parallel to and in alignment with the short limb, said third limb terminating in a hook engageable with the short limb, said hook constituting a safety feature having its bill turning in a direction opposite to that faced by the snap hook, the third limb being a continuation of one end of the wire and a portion thereof being coiled around the long limb at a point inwardly of said eye.

ROBERT L. HOPKINS.